(12) United States Patent
Mordkovich et al.

(10) Patent No.: US 9,878,314 B2
(45) Date of Patent: Jan. 30, 2018

(54) CATALYST FOR DIRECT PRODUCTION OF ISOPARAFFINS-RICH SYNTHETIC OIL AND A METHOD FOR PREPARING THE CATALYST

(71) Applicants: INFRA XTL TECHNOLOGY LIMITED, Limassol (CY); Vladimir Zalmanovich Mordkovich, Moscow (RU)

(72) Inventors: Vladimir Z. Mordkovich, Moscow (RU); Lilia V. Sineva, Moscow (RU); Ekaterina Yu Khatkova, Moscow region (RU); Ilia S. Ermolaev, Moscow (RU)

(73) Assignee: Infra XTL Technology Ltd., Limassol (CY)

( * ) Notice: Subject to any disclaimer, the term of this patent is extended or adjusted under 35 U.S.C. 154(b) by 0 days.

(21) Appl. No.: 15/039,692

(22) PCT Filed: Nov. 26, 2013

(86) PCT No.: PCT/RU2013/001061
§ 371 (c)(1),
(2) Date: May 26, 2016

(87) PCT Pub. No.: WO2015/080611
PCT Pub. Date: Jun. 4, 2015

(65) Prior Publication Data
US 2016/0375430 A1    Dec. 29, 2016

(51) Int. Cl.
| | |
|---|---|
| *B01J 29/18* | (2006.01) |
| *B01J 29/24* | (2006.01) |
| *B01J 29/40* | (2006.01) |
| *B01J 29/68* | (2006.01) |
| *B01J 29/76* | (2006.01) |
| *B01J 25/00* | (2006.01) |
| *B01J 35/00* | (2006.01) |
| *B01J 35/10* | (2006.01) |
| *B01J 37/00* | (2006.01) |
| *B01J 37/04* | (2006.01) |
| *B01J 37/08* | (2006.01) |
| *B01J 29/70* | (2006.01) |
| *C10G 2/00* | (2006.01) |

(52) U.S. Cl.
CPC ......... *B01J 29/7615* (2013.01); *B01J 25/00* (2013.01); *B01J 29/18* (2013.01); *B01J 29/24* (2013.01); *B01J 29/40* (2013.01); *B01J 29/68* (2013.01); *B01J 29/7057* (2013.01); *B01J 35/0006* (2013.01); *B01J 35/1061* (2013.01); *B01J 37/0009* (2013.01); *B01J 37/04* (2013.01); *B01J 37/08* (2013.01); *C10G 2/334* (2013.01)

(58) Field of Classification Search
CPC ... B01J 29/18; B01J 29/24; B01J 29/40; B01J 29/68; B01J 29/7615; B01J 25/00; B01J 35/0006; B01J 35/1061; B01J 37/0009; B01J 37/04; B01J 37/08
See application file for complete search history.

(56) References Cited

U.S. PATENT DOCUMENTS

| | | | | |
|---|---|---|---|---|
| 6,649,799 B2 * | 11/2003 | Ostgard | ............... | C07C 209/48 564/385 |
| 8,735,317 B2 * | 5/2014 | Mordkovich | ............ | B01J 23/75 502/174 |

* cited by examiner

*Primary Examiner* — Cam N. Nguyen
(74) *Attorney, Agent, or Firm* — Patentagar PLLC; Alexander Rabinovich

(57) ABSTRACT

A catalyst for producing isoparaffins-rich synthetic oil is a granulated porous composite material comprising a three-dimensional heat-conducting structure of metal aluminum and Raney cobalt, and a binding component comprising an H-form zeolite. The particles of Raney cobalt and zeolite are in mutual direct contact. Fractions of macropores in an open porosity of the catalyst granules and of mesopores of the size of 70-500 Å in an open porosity of the catalyst granules are respectively 55-79% and 7-20%, a fraction of micropores being the rest. A method for preparing the catalyst comprises mixing binding component powders, peptizing the mixture with a nitric acid solution, mixing obtained homogeneous gel with powders of Raney cobalt and metal aluminum and a liquid phase to form a paste, extruding same into granules and calcinating the granules. The catalyst improves reagents mass transfer inside the granules and increases isoparaffine content in the produced oil.

14 Claims, No Drawings

CATALYST FOR DIRECT PRODUCTION OF ISOPARAFFINS-RICH SYNTHETIC OIL AND A METHOD FOR PREPARING THE CATALYST

CROSS-REFERENCE TO RELATED APPLICATIONS

This application is a U.S. National phase continuation-in-part application of the International application PCT/RU2013/001061 filed Nov. 26, 2013, the International application being hereby incorporated by reference in its entirety.

BACKGROUND OF THE INVENTION

1. Field of the Invention

The present invention relates to the fields of oil chemistry, gas chemistry, coal chemistry and technique for preparing catalysts used in reactions of hydrogenation of carbon monoxide, for example, for producing hydrocarbons from CO and $H_2$ via Fisher-Tropsch method (synthesis), ultraliquid $C_{5+}$ products, such as synthetic oil and components of motor fuels, or synthesis products for subsequent processing in petrochemical and gasochemical processes. In particular, the invention relates to a method for producing $C_{5+}$ hydrocarbons over a cobalt catalyst in "gas to liquid" processes (XTL) where a syngas source can be any of organic (carbon-containing) substances such as gas and liquid hydrocarbons or mixtures thereof, gas hydrates, coal, shales, biomass.

2. Description of the Related Art

Synthesis of hydrocarbons from CO И $H_2$ proceeds in the presence of catalysts based on metals of group VIII of the Mendeleev's periodic table. The catalyst composition defines a composition of the obtained products. Cobalt catalysts are considered as selective catalysts for synthesis of paraffins. The presence of cobalt applied on oxide supports generally results in formation of linear paraffins. Cobalt catalysts on zeolites or mixed oxides are used to obtain a product with high content of branched paraffins. In this case, hydrocarbons of gasoline fraction ($C_5$-$C_{10}$) with isomer content up to 80% are generally obtained. However, high content of branched hydrocarbons in diesel fraction ($C_{11}$-$C_{18}$) is equally important because it decreases the cloud point temperature (freezing temperature) and viscosity of the resulting diesel fuel. Pour point temperature and viscosity are also important for pipeline transportation of synthetic oil together with mineral oil.

It is known that hydrocarbons can undergo various transformations in the presence of solid acids among which are mixed oxides and zeolites (Zeolite chemistry and catalysis, V. 2, Edited by J. Rabo, Moscow, 1980, p. 422; V. U. S. Rao, R. J. Gormley. Catal. Today. 1990. V. 6. P. 207; H. Van Bekkum, E. M. Flanigen, J. C. Jansen Stud. Surf. Sci. Catal. 1991. V. 58. P. 455). Application of metal salts on a solid acid such as zeolite leads to formation of catalysts functioning as metal and acid contacts. Olefins formed from CO and $H_2$ on metallic sites or their intermediates can undergo secondary transformation, such as isomerization and/or hydroisomerization, on acid sites to form aromatic or branched aliphatic hydrocarbons, and alkanes can undergo hydrocracking to form shorter hydrocarbon chains. Generally, the isomerization/hydroisomerization proceeds at lower temperature as compared with hydrocracking. The ratio of synthesis products will probably be defined by relative rates of reactions on the acid and metal sites. In this case, since increase in the syngas velocity accelerates mass exchange, olefin residence time in pores filled with liquid decreases, and therefore the probability of the olefin secondary transformation on the zeolite component of the catalyst decreases.

Known in the art is a Fisher-Tropsch synthesis catalyst to reduce the yield of methane by-product and increase the yield of $C_{5+}$ olefins, wherein a cobalt catalyst for Fisher-Tropsch synthesis is applied on zeolite molecular sieves (patent JP 2083038A, 1990). Preparation of this catalyst comprises steaming the molecular sieve LZ-2/0, in which the initial $SiO_2/Al_2O_3$ ratio is 8.0, to obtain the TC-123 support, and filling pores of said molecular sieves with ethylene glycol solution, water, alcohol and the like comprising a Co- and Mn-containing promoter. In the presence of the Fisher-Tropsch synthesis catalyst prepared by that way and containing 8.2% of Co and 1.6% of Mn/TC-123, the selectivity of the methane formation from CO and $H_2$ at their ratio of 1:1 (feed velocity is 300 $hr^{-1}$ at 240° C.) can decrease to 3.3% while selectivity of $C_{5+}$ hydrocarbons formation can increase to 89%. A drawback of this catalyst is its low activity, since the conversion of CO in the presence of this catalyst was less than 48% even in a reactor of 3 mm in diameter.

Also known in the art is a Fischer-Tropsch synthesis catalyst comprising cobalt, scandium and a suitable support (patent application WO/1993/005000 A1). The application also describes a process for producing hydrocarbons from a syngas (CO+$H_2$) in the presence of this catalyst. The support may be silica gel, alumina, silica-alumina and kieselguhr, if the required product is wax or middle distillates. Alternatively, the support may be a molecular sieve or zeolite, if gasoline or middle distillate and gasoline are to be produced. A drawback of this catalyst is low $C_{2+}$ hydrocarbons productivity, since the output was no more than 213 mg $C_{2+}$/g/h at feed velocity of the mixture $H_2$ and CO (2:1) of 1000 $hr^{-1}$, 240° C. and 2 MPa.

Known in the art is a method of conversion of syngas comprising contacting the syngas with a hybrid bimetallic Fischer-Tropsch catalyst obtained by impregnation of ZSM-12 zeolite granules with a non-aqueous solution of cobalt and ruthenium salts and activated by a reduction-oxidation-reduction procedure (patent application WO/2011/062773 A2). The method provides decreased methane yield and increased yield of solid wax-free liquid hydrocarbons. Drawbacks of this catalyst are low activity (conversion of CO is 24-42%) and productivity (0.122 g $CH_2$/gcat/h).

Also known in the art is a method for producing gasoline hydrocarbon fractions from a syngas of $H_2$k, CO and $CO_2$ by contacting the gas mixture with a catalyst in at least two successive reaction zones at the pressure of 40-100 atm. In the first reaction zone, the gas mixture comes in contact with a bifunctional catalyst comprising zeolite of ZSM-5 or ZSM-11 structure and metal-oxide component composed of oxides of Zn, Cr H W at the temperature of 340-420° C. In the second reaction zone, the gas mixture comes in contact with a monofunctional catalyst comprising zeolite of ZSM-5 or ZSM-11 structure at the temperature of 320-460° C. The gas flow coming out of the reactor is recycled. This method characterized in that the zeolite of the monofunctional catalyst contains iron in the amount of 0.3-1% by weight (patent RU 2339603 C1, 2008). The use of this method enables reducing the regeneration temperature and regeneration time of the monofunctional catalyst. Disadvantages of this process are high synthesis temperature and pressure resulting in high energy consumption, and complicated process flow scheme including at least two reactors and a complicated pipeline system.

Known in the art is a method for preparing a catalyst for synthesis of $C_5$-$C_{10}$ aliphatic hydrocarbons from carbon monoxide and hydrogen, comprising two-stage impregnating Y or ZSM zeolite with a solution of cobalt nitrate with intermediate calcination in an air stream at the temperature of 350-450° C. and drying to prepare the catalyst having improved activity and selectivity with respect to isoparaffin hydrocarbons (patent RU 2297879 C1, 2007 or patent application WO/2007/121224 A2). In this method, the maximum yield of $C_{5+}$ hydrocarbons is 122 g/m$^3$, 70% of which is $C_5$-$C_{10}$ gasoline fraction containing up to 80% isoparaffins. A disadvantage of this method for preparing the catalyst is lack of the stage of calcination after the second impregnation with a water solution of cobalt nitrate, that results in that cobalt nitrate decomposition with nitrogen oxides formation already proceeds in the synthesis reactor, that requires increased attention to the quality of the used materials. A drawback of this catalyst is low activity as the conversion of CO is no more than 54% that requires additional costs for gas recycling.

Known in the art is a composite catalyst comprising a water-gas shift catalyst coated with a thin film of zeolitic material on which, in turn, a Fischer-Tropsch catalyst is deposited (patent application WO/1992/019574 A1). Fischer-Tropsch synthesis by-products, namely a short chain of hydrocarbons and steam, pass through zeolite pores to the water-gas shift catalyst, and carbon monoxide and hydrogen formed over this catalyst diffuse back to the Fischer-Tropsch catalyst on the outer surface of the zeolite and react there to produce hydrocarbon oligomers. The Fischer-Tropsch reaction produces water, therefore the catalyst shall be stable in the presence of steam. The catalyst comprises supports such as silicon oxide, alumina, zirconium oxide, thorium oxide or mixtures thereof coated with a layer of zeolite of 2 to 10 nm in thickness. USY zeolite, silica-rich mordenite, offretite, zeolite omega, ZSM-5, silicalite, X and Y zeolites are used to prepare the catalyst. The composite catalyst also comprises promoters selected from the group consisting of Re, Ru, Pd, Pt, $ThO_2$, $ZnO_2$, $Al_2O_3$, MgO and MnO. Moreover, the catalyst may comprise Li, Na, K, Ca, Mg and Fe, Cu or Zn as a component of the water-gas shift catalyst and cobalt as an active metal for Fischer-Tropsch synthesis. Drawbacks of the catalyst are that the catalyst preparation process is complicated and the catalyst cannot be used in a granular bed because the catalyst is in the form of microspheres appropriate for use in slurry reactors.

Known in the art are processes for the single-stage producing of synthetic hydrocarbons enriched in gasoline fraction with high-octane components (aromatic hydrocarbons, naphthenes, olefinic and branched hydrocarbons) as well as catalysts for these processes. The catalysts are a physical mixture of a Fischer-Tropsch catalyst with a hydroisomerization and/or hydrocracking catalysts (patent applications JP 2011125802 A, 2011; US 20110160315 A1, 2011; U.S. Pat. Nos. 7,300,959 B2, 2007; 7,157,501 B2, 2007; 7,973,086 B1, 2011). Disadvantages of these processes are high yield of unsaturated compounds, in particular aromatic hydrocarbons, the presence of which in automobile fuel is outlawed in many countries, high cloud point temperature (2-10° C.) of produced hydrocarbons and low catalyst activity.

Also known in the art is a process for decreasing pour point temperature of hydrocarbons products produced by Fischer-Tropsch synthesis and a catalyst for this process. The catalyst is a mixture of TON structure type zeolites (Theta-1, ZSM-22, ISI-1, NU-10 and KZ-2), at least one ZBM-30 zeolite, at least one inorganic porous matrix, and at least one hydrogenating/dehydrogenating element from the VIB group or group VIII of the periodic table (patent RU 2346977 C2, 2006). The result is that the pour point temperature decreases from 42° C. to minus 24° C. A disadvantage of this process is the need for additional stage in the process flow for producing hydrocarbons from CO and $H_2$.

The process for producing hydrocarbons from CO and $H_2$ (Fischer-Tropsch synthesis) is characterized by exothermicity and sensitivity to the reaction temperature. The increase of the synthesis temperature results in the increase of overall catalyst activity but the selectivity for the target products significantly decreases due to significant increase of the yield of synthesis by-products, namely methane and carbon dioxide. One of alternative solutions of the above-mentioned problems when carrying out the process in a stationary (fixed) bed of the catalyst is increasing thermal conductivity of the granulated catalyst. For that purpose, heat-conductive materials can be used when preparing the Fischer-Tropsch synthesis catalyst. Known in the art is using heat-conductive materials as exothermic processes catalysts supports on which an active component is deposited. Patent EP 1020222 B2, 2004 discloses the use of cylindrical copper granules coated with Al, Zn or Ni as a catalyst for an exothermic process of oxychlorination of ethylene to 1,2-dichloroethane. This catalyst has thermal conductivity of 0.4 W/cm·K.

Known in the art is a method for preparing a catalyst for exothermic processes, consisting in the deposition of several layers of metal alloys on a support of iron, steel, titanium, nickel or copper preheated in an argon stream (patent application WO 200176737 A1, 2001). Disadvantages of these processes are their complexity and high energy consumption and labor input.

Known in the art is a cobalt-based catalyst for synthesis of aliphatic hydrocarbons from CO and $H_2$ (patent RU 2256501 C1, 2005), comprising metal aluminum powder as a support. Additionally, the catalyst may comprise a promoter selected from the group of metal oxides ($ZrO_2$, $La_2O_3$, $K_2O$) or metals (Re, Ru, Pd, Pt). The catalyst comprises 10-50 wt. % of Co, 0.5-3 wt. % of the promoter, 50-90 wt % of Al. The catalyst is prepared by impregnation of the aluminum powder with a water solution of cobalt nitrate and by further drying on a water bath and calcination in an air stream at 450° C. during 1 hour. A treatment with hydrogen is carried out at the temperature of 400-600° C. and $H_2$ feed velocity of 100-3000 $^{-1}$ for 1-5 hours. The synthesis is carried out at the atmospheric pressure and temperature of 160-230° C. from the mixture comprising 66-68 mole % of $H_2$ and 32-34 mole % of CO. Drawbacks of this catalyst are insufficient selectivity and productivity for the target products.

Known in the art is a granulated Fischer-Tropsch synthesis catalyst based on a metal of group VIII of the Mendeleev's periodic table and metal aluminum, as well as a method for preparing the catalyst (patent RU 2326732 C1, 2006). The active metal (5-40% of the catalyst weight) is applied on a support by impregnation. The support is prepared by extrusion from a paste comprising an oxide component (aluminum oxide and/or silicon oxide and/or titanium oxide and/or zirconium oxide), 1-25% of metal aluminum (heat-conducting component) in the form of flakes and 5-15% of SB-1 boehmite as a binding agent. The method for preparing the catalyst comprises preparing the support comprising the oxide component, a metal aluminum powder, diethyl ether, the binding agent, water, a plasticizer and a pore-forming agent by extrusion, drying and calcination, and following sequential stages of impregnation with a solution of the active metal salt. The support may comprise 0.1-5% of promoter (zirconium or metals of groups VII-VIII of the Mendeleev's periodic table and/or their oxides) introduced by impregnation of the support with a solution of the corresponding salts. Before the synthesis, the catalyst is activated in a hydrogen stream (space velocity is 100-5000 $h^{-1}$) at the temperature of 300-600° C. for 0.5-5 hours. The synthesis of hydrocarbons from CO and $H_2$ is carried out in a tubular fixed bed catalytic reactor at the pressure of 0.1-4 MPa and the temperature of 150-300° C. Molar ratio $CO/H_2$ in the synthesis gas is 1/1 to 3. A drawback of this catalyst is that the active component is applied both on the oxide support and heat-conducting component powder, that requires introduction of the active metal in the amount exceeding the amount required to ensure the claimed activity and selectivity.

A metal phase prevailing in Raney catalysts provides such advantage as high heat conductivity. It is particularly important for efficient heat removal from the reaction zone. The overheating of the deposited catalyst during the synthesis of hydrocarbons from CO and $H_2$ results in the coarsening of cobalt crystallites and decreasing activity and selectivity of this system. Therefore, researchers have repeatedly attempted to create a highly efficient Fischer-Tropsch synthesis catalyst on the base of Raney cobalt. In this regard, improvement of known and development of new methods for preparing initial alloys for skeletal catalysts and conditions of leaching and passivation thereof have allowed resuming researches in this field. Known in the art are catalysts of disperse active metal for using in hydrogenation reactions, which catalysts are different in methods of passivation and activation (U.S. Pat. Nos. 6,531,518, 2003, and 6,706,661, 2004). Drawbacks of these catalysts are low specific activity and low specific productivity. Moreover, these catalysts cannot be used in a granulated fixed bed.

Raney catalysts were tested in the synthesis of hydrocarbons from CO and $H_2$ substantially immediately after discovery of them at the initial stage of the Fischer-Tropsch synthesis development in 1934 (Fischer, F., and Meyer, K. Suitability of Alloy Skeletons as Catalysts for Benzine Synthesis. Brennstoff-Chem., vol. 15, 1934, pp. 84-93, 107-110; Ber. Deut. Chem. Gesell., vol. 67B, 1934, pp. 253-261; Ges. Abhandl. Kenntnis Kohle, vol. 12, 1937, pp. 356-382). It has been determined that these catalysts exhibit activity in the synthesis of hydrocarbons from CO and $H_2$. The Ni—Co—Si alloy (1/2:1/2:1) was the most active. However, the activity of the Raney catalysts was lower than activity of Fe-based catalysts used in the industry at that time. Moreover, the Raney catalysts was characterized by several drawbacks such as high content of an active component, low specific activity (calculated per unit of metal weight), high specific weight, low productivity and pyrophorosity that complicated storing of the catalyst.

At the end of the 60's of the twentieth century, Russian scientists made an attempt to return to the study of skeletal catalysts for the synthesis of hydrocarbons from CO and $H_2$ (Eidus Ya. T. //XTT. 1971, No. 3, pages 654-656). However, the comparison of the results obtained for a skeletal sample on the base of Co—Ni—Al alloy and deposited Co—Ni catalyst promoted by oxides of Al, Mn and Th showed that the deposited catalyst is more preferable.

Known in the art are single attempts to introduce Raney cobalt in the form of an alloy with aluminum in a granulated catalyst, but for using in hydrogenation processes (U.S. Pat. No. 5,536,694, 1996). A method disclosed in this patent comprises preparing a power mixture consisting of at least one alloy and at least one binder, wetting agent and additive consisting of a mixture of a shaping aid, a lubricant, a plasticizer and a pore-forming agent. Raney metal is also used as a binder, but it differs from Raney metal included in the alloy. The alloy consists of at least one Raney metal, a leachable component (Al, Zn, Si or mixtures thereof) and a promoter (Cr, Fe, Co, Ta, Ti or mixtures thereof). The above-mentioned mixture is shaped, dried at 80-120° C. and calcined at 500-700° C. The particle size of the alloy should be 10-500 and the particle size of the binder should be less than the particle size of the alloy. The prepared catalyst consists of more than 99% of the alloy and the binder. The obtained granules are leached with 20% NaOH at 80° C. to activate only an outer layer 0.05-1 mm in thickness. Disadvantages of the method are high labor intensity and high prime cost that complicate commercial use of the method.

Also known in the art is a process for catalytic hydrogenation of CO in several successive three-phase reactors to form a mixture of hydrocarbons (U.S. Pat. No. 6,642,281 B1, 2003), wherein a catalyst at least in the first reactor is a fine-dispersed active metal, namely Raney cobalt. Raney cobalt is prepared by fusion of cobalt with aluminum, titanium, silicon or zinc, crushing the obtained alloy to a powder and then removing aluminum, titanium, silicon or zinc.

Also known in the art is a granulated catalyst for hydrogenation processes in a fixed-bed catalytic reactor and a method of preparing the catalyst (U.S. Pat. No. 4,826,799 A1, 1989). The catalyst comprises Raney metal in the amount of 15-50 parts by weight, high-molecular polymer (for example, polyethylene) in the amount of 1-30 parts by weight, α-alumina in the amount of 1-42 parts by weight and homogeneous. Mineral oil is used as a plasticizer in the amount of 0-40 parts by weight. This mixture is shaped by extrusion or fusion and calcined at the temperature of 850-1200° C. to remove the polymer and the plasticizer. The mixture is then treated with a solution of sodium hydroxide to remove aluminum from the alloy. The catalyst may comprise promoters introduced in the initial Raney alloy and selected from the group consisting of Cr, Mo, Ru, Rh, Pd, Os, Ir, and Pt. The catalyst has the BET specific surface area of 20-80 $m^2/g$ and macropore volume of 0.1-70% of the total pore volume. A disadvantage of this process is need for a high-temperature treatment that requires a special equipment and significantly increases the cost of the catalyst.

Considered the closest prior art to the present invention is a catalyst for synthesis of hydrocarbons from CO and $H_2$, which is a granulated porous composite material comprising three-dimensional heat-conducting structure of metal aluminum and Raney cobalt as well as a binding component (RU 2405625C1, 2010, having WO 2010/147513 A2, 2010 in its family). This known catalyst comprises Raney cobalt as at least one active component in the amount of 1-40% of catalyst weight, metal aluminum in the amount of 25-94% of catalyst weight and a binding component in the amount of 5-30% of catalyst weight. Raney cobalt in the known catalyst is in the form of fine powder, including cobalt carbonyl powder. A method for preparing this catalyst comprises mixing of Raney cobalt powder, metal aluminum powder and binding component powder with liquid phase, preparing granules of the mixture by extrusion of the obtained paste, drying and calcination of the prepared granules. The known catalyst has high tolerance to overheating and provides high productivity for synthesis of $C_5$-$C_{10}$ hydrocarbons. A drawback of this catalyst and the method for preparing same is that the catalyst structure obtained by this method does not provide adequate mass transfer of molecules of the reagents and products inside the granule while content of isoparaffins in the produced synthetic oil is insufficient.

SUMMARY OF THE INVENTION

The object of the present invention is to provide an efficient catalyst that ensures improved mass transfer of reagent molecules and production of synthetic oil, the content of isoparaffins in which is more than 15 wt % greater than in the closest prior art (the above-mentioned WO 2010/147513), as well as to provide a method for producing this efficient catalyst.

This object is accomplished by that in a catalyst for producing isoparaffins-rich synthetic oil from CO and $H_2$, where said catalyst is a granulated porous composite material comprising a three-dimensional heat-conducting structure of metal aluminum and Raney cobalt particles, and a binding component, according to the present invention, the binding component comprises H-form zeolite wherein a fraction of macropores in an open porosity of the catalyst granules is 55-79% and a fraction of mesopores of the size of 70-500 Å in an open porosity of the catalyst granules is 7-20%.

The use of H-form zeolite in the catalyst of the present invention in combination of the above-specified percentages of the macropore and mesopore fractions in the catalyst open porosity ensures direct contact of the Raney cobalt particles with the H-form zeolite particles, provides improved mass transfer of reagents molecules and higher content of isoparaffins in the produced synthetic oil, that is confirmed by experimental data (see examples below).

Increasing the fraction of the macropores over said upper limit results in decrease of a catalyst activity, while decreasing the fraction of the macropores below said lower limit results in decreasing the content of isoparaffins in the produced synthetic oil. As compared with the closest prior art, the fraction of the macropores of the catalyst granules according to the present invention has been decreased, and the fraction of the mesopores has been increased. Increasing the fraction of the mesopores within the above-stated limits provides increasing the content of isoparaffins in the produced synthetic oil.

Thermal conductivity of the catalyst granules of the present invention is no less than 4 W/m·K, that is a result of formation of the single three-dimensional heat-conducting structure of fine powders of the metal aluminum and active component in the form of the Raney cobalt.

Moreover, according to the present invention, beta zeolite and/or mordenite and/or ZSM-5 in H-form are used as the H-form zeolite.

The content of the Raney cobalt in the catalyst of the present invention is 10-50% of the catalyst weight, with the Raney cobalt is in the form of a fine powder, the particle size of which is not more than 80 μm. Content of the Raney cobalt less 10% does not lead to the desired effect, and the content more than 50% of the catalyst weight is undesired because of significant increase in the prime cost of the catalyst.

The content of metal aluminum in the catalyst of the present invention is 10-50% of the catalyst weight, with metal aluminum is in the form of a fine powder. The content of the fine powder of aluminum less 10% of the catalyst weight does not lead to the desired effect, and the content more than 50% significantly decreases the catalyst activity.

The content of the binding component in the catalyst of the present invention is 15-80% of the catalyst weight. The binding component may also comprises boehmite. According to the present invention, the content of the H-form zeolite is 20-70% of the binding component weight. The content of the binding component less than 15% of the catalyst weight is undesired because of significant decrease in strength of the produced catalyst granules, and the content of more than 80% significantly decreases the catalyst activity.

The catalyst according to the present invention ensures producing a synthetic oil, the content of isoparaffins in which is more than 15 wt. % greater than in the above-mentioned closest prior art, with content of isoparaffins in a diesel fraction reaches 40%, and the predicted cloud point temperature of the synthetic oil is minus 80° C.

The object is also accomplished by that, according to the present invention, there is provided a method for preparing a catalyst for producing isoparaffins-reach synthetic oil from CO and $H_2$, comprising mixing of powders of a binding component, peptizing the obtained mixture with solution of nitric acid to obtain the binding component in the form of a homogeneous gel, mixing the homogeneous gel with a fine powder of Raney cobalt, a metal aluminum powder and a liquid phase to form a homogeneous paste, extruding the prepared paste to form granules, and calcinating the formed granules, wherein H-form zeolite is used as one of said powders of said binding component.

Boehmite can be used as another, second powder of the binding component. Triethylene glycol and/or ethyl alcohol can be used as the liquid phase. The obtained catalyst granules according to the present invention are calcinated in air or in inert atmosphere at the temperature increasing from 25 to 450° C. during 24-48 hours, preferably 20-30 hours. The finished or calcinated catalyst granules have thermal conductivity no less than 4 W/m·K and are characterized by the presence of macropores, the fraction of which in an open porosity of the catalyst granules is 55-79%, and mesopores of the size of 70-500 Å, the fraction of which in the open porosity of the catalyst granules is 7-20%, a fraction of micropores being the rest.

The use, in the method according to the present invention, of the H-form zeolite as one of the powders of the binding component in combination with the peptization of the binding component powders mixture to form the binding component in the form of the homogeneous gel and the following mixing the gel with the Raney cobalt and metal aluminum powders to form the homogeneous paste ensures preparation of the catalyst, in which the Raney cobalt particles, after the extrusion of the paste to form the catalyst granules, are in direct contact with the zeolite particles. The three-dimensional heat-conducting structure of the metal aluminum and Raney cobalt, formed in the finished catalyst, has the enhanced thermal conductivity and provides the improved mass transfer of reagents involved in the oil synthesis.

It has been found experimentally that direct contact of Raney cobalt particles with H-form zeolite particles leads to the sharp increase of the isoparaffins content in the product provided that the catalytic composite structure ensures the sufficient mass transfer of the reagents and product molecules inside of the catalyst granules, while the optimum fraction of macropores in open porosity of the granules is 55-79% and the fraction of mesopores of the size of 70-500 Å in open porosity of the granules is 7-20%, a fraction of micropores being the rest, and ensures sufficient removal of the reaction heat from active sites, that is thermal conductivity of the granules is no less than 4 W/m·K.

DETAILED DESCRIPTION OF THE INVENTION

The method for preparing the catalyst according to the present invention is carried out as follows. The boehmite powder and the H-form zeolite powder are mixed. The latter may be beta zeolite in H-form and/or mordenite in H-form and/or ZSM-5 in H-form. The mixture of these powders is peptized with a solution of nitric acid to form a homogeneous gel. Then, this gel is mixed with the finely-divided Raney cobalt, finely-divided metal aluminum, triethylene glycol and ethyl alcohol to form a homogeneous paste. The prepared paste is extruded to form granules, which then are calcined. As a result, the catalyst according to the present invention is prepared, being a granulated porous composite material comprising a three-dimensional heat-conducting structure of metal aluminum and Raney cobalt as well as a binding component comprising zeolite in H-form, with the Raney cobalt particles being in direct contact with the zeolite particles.

The finished granules of the catalyst according to the present invention have thermal conductivity no less than 4 W/m·K and characterized by the presence of macropores, the fraction of which in open porosity of the catalyst is 55-79%, and mesopores of the size of 70-500 Å, the fraction of which in open porosity of the granules is 7-20%, a fraction of micropores being the rest.

Before the synthesis of oil from CO and $H_2$, the catalyst is activated in a hydrogen stream or a hydrogen-containing gas stream (volume velocity is 1000-10000 $h^{-1}$, preferably 3000-5000 $h^{-1}$) at the atmospheric pressure and the temperature of 300-450° C. for 0.5-10 hours (preferably 1-5 hours).

The synthesis of the oil is carried out in a tubular reactor with a fixed bed of the catalyst at the pressure of 1-5 MPa, preferably 2-2.5 MPa, and the temperature of 160-320° C., preferably 180-250° C. The $CO:H_2$ molar ratio in the syngas is 1:1÷3 (preferably 1:2÷2.5). The syngas may comprise up to 20% of nitrogen.

INDUSTRIAL APPLICABILITY

EXAMPLE 1

A catalyst comprising 10% of HB (beta zeolite in H-form), 20% of Raney cobalt, 50% of Al and 20% of boehmite was prepared as follows.

Powders of HB zeolite (1 g) and boehmite (2 g) were thoroughly mixed in a porcelain dish, the obtained mixture was peptized with a solution of 0.45 ml of $HNO_3$ (64%) in 7 ml of distilled water and mixed to form a homogeneous gel. Raney cobalt in the amount of 2 g, 5 g of PAP-2 aluminum powder, 1.5 g of triethylene glycol grade A, and 3 g of ethyl alcohol were added to the prepared gel. The content of the dish was thoroughly mixed to form a homogeneous paste. The prepared paste was introduced into an extruder, the die diameter of which was 2.5 mm, and extruded. The obtained granules were held in air at the room temperature for 15 hours and calcined in an air stream at the temperature increasing from 25 to 450° C. for 27 hours. The prepared granules were cooled to the room temperature and crushed to the particle size of 2.5×2.5 mm.

Thermal conductivity of the finished catalyst was 4.57 W/m·K, the fraction of macropores in open porosity of the catalyst was 69.7%, and the fraction of mesopores of the size of 70-500 Å was 17.8%.

Before the synthesis of the oil, the catalyst was activated in a hydrogen stream (3000 $h^{-1}$) at the atmospheric pressure and the temperature of 400° C. for 1 hour.

As a result of the synthesis from CO and $H_2$ at the temperature of 233° C. and the syngas velocity of 1000 $h^{-1}$, hydrocarbons $C_{5+}$ were produced, the isoparaffins content being 30% in the synthetic oil and 40% by weight in the diesel fraction, the productivity for isoparaffins was 44 g/kgcat/h, the cloud point temperature of the synthetic oil was minus 78° C. When the synthesis was carried out at the temperature of 248° C. and the syngas velocity of 5000 $h^{-1}$, the isoparaffins content was 30% by weight, the productivity for isoparaffins was 61 g/kgcat/h and the cloud point temperature was minus 82° C.

EXAMPLE 2

A catalyst comprising 15% of HB, 15% of Raney cobalt, 50% of Al and 20% of boehmite was prepared as follows.

Powders of HB zeolite (1.5 g) and boehmite (2 g) were thoroughly mixed in a porcelain dish, the obtained mixture was peptized with a solution of 0.45 ml of $HNO_3$ (64%) in 7 ml of distilled water and mixed to form a homogeneous gel. Raney cobalt in the amount of 1.5 g, 5 g of PAP-2 aluminum powder, 1.5 g of triethylene glycol grade A, and 3 g of ethyl alcohol were added to the prepared gel. The content of the dish was thoroughly mixed to form a homogeneous paste. The prepared paste was introduced into an extruder, the die diameter of which was 2.5 mm, and extruded. The obtained granules were held in air at the room temperature for 15 hours and calcined in an air stream at the temperature increasing from 25 to 450° C. for 27 hours. The prepared granules were cooled to the room temperature and crushed to the particle size of 2.5×2.5 mm.

Thermal conductivity of the prepared catalyst was 4.42 W/m·K, the fraction of macropores in open porosity of the catalyst was 70.5%, and the fraction of mesopores of the size of 70-500 Å was 19.2%.

Before the synthesis of oil, the catalyst was activated in a hydrogen stream (3000 $h^{-1}$) at the atmospheric pressure and temperature of 400° C. for 1 hour.

As a result of the synthesis from CO and $H_2$ at the temperature of 231° C. and the syngas velocity of 1000 $h^{-1}$, hydrocarbons $C_{5+}$ were produced, the isoparaffins content was 30% in the synthetic oil and 40% by weight in the diesel fraction, the productivity for isoparaffins was 44 g/kgcat/h, the cloud point temperature of the synthetic oil was minus 78° C. When the synthesis was carried out at the temperature of 248° C. and the syngas velocity of 5000 $h^{-1}$, the isoparaffins content was 30% by weight, the productivity for isoparaffins was 61 g/kgcat/h and the cloud point temperature was minus 82° C.

EXAMPLE 3

A catalyst comprising 20% of HB, 10% of Raney cobalt, 50% of Al and 20% of boehmite was prepared as follows.

Powders of HB zeolite (2 g) and boehmite (2 g) were thoroughly mixed in a porcelain dish, the obtained mixture was peptized with a solution of 0.45 ml of $HNO_3$ (64%) in 7 ml of distilled water and mixed to form a homogeneous gel. Raney cobalt in the amount of 1 g, 5 g of PAP-2 aluminum powder, 1.5 g of triethylene glycol grade A, and 3 g of ethyl alcohol were added to the prepared gel. The content of the dish was thoroughly mixed to form a homogeneous paste. The prepared paste was introduced into an extruder, the die diameter of which was 2.5 mm, and extruded. The obtained granules were held in air at the room temperature for 15 hours and calcined in an air stream at the temperature increasing from 25 to 450° C. for 27 hours. The prepared granules were cooled to the room temperature and crushed to the particle size of 2.5×2.5 mm.

Thermal conductivity of the produced catalyst was 4.17 W/m·K, the fraction of macropores in open porosity of catalyst was 73.4%, and the fraction of mesopores of the size of 70-500 Å was 17.1%.

The catalyst was activated in a hydrogen stream (3000 $h^{-1}$) at the atmospheric pressure and temperature of 400° C. for 1 hour.

As a result of the synthesis from CO and $H_2$ at the temperature of 228° C. and the syngas velocity of 1000 $h^{-1}$, hydrocarbons $C_{5+}$ were produced, the isoparaffins content was 28% in the synthetic oil and 38% by weight in the diesel fraction, the productivity for isoparaffins was 43 g/kgcat/h, the cloud point temperature of the synthetic oil was minus 66° C., and when the synthesis was carried out at the temperature of 243° C. and the syngas velocity of 4000 $h^{-1}$, the isoparaffins content was 26% by weight, the productivity for isoparaffins was 79 g/kgcat/h and the cloud point temperature was minus 70° C.

EXAMPLE 4

A catalyst comprising 20% of HB, 50% of Raney cobalt, 10% of Al and 20% of boehmite was prepared as follows.

Powders of HB zeolite (2 g) and boehmite (2 g) were thoroughly mixed in a porcelain dish, the obtained mixture was peptized with a solution of 0.45 ml of $HNO_3$ (64%) in 7 ml of distilled water and mixed to form a homogeneous gel. Raney cobalt in the amount of 5 g, 1 g of PAP-2 aluminum powder, 1.5 g of triethylene glycol grade A, and 3 g of ethyl alcohol were added to the prepared gel. The content of the dish was thoroughly mixed to form a homogeneous paste. The prepared paste was introduced into an extruder, the die diameter of which was 2.5 mm, and extruded. The obtained granules were held in air at the room temperature for 15 hours and calcined in a nitrogen stream at the temperature increasing from 25 to 450° C. for 30 hours. The prepared granules were cooled to room temperature and crushed to the particle size of 2.5×2.5 mm.

Thermal conductivity of the prepared catalyst was 4.11 W/m·K, the fraction of macropores in open porosity of the catalyst was 78.4%, and the fraction of mesopores of the size of 70-500 Å was 16.8%.

The catalyst was activated in a hydrogen stream (3000 $h^{-1}$) at the atmospheric pressure and temperature of 400° C. for 1 hour.

As a result of the synthesis from CO and $H_2$ at the temperature of 228° C. and the syngas velocity of 1000 $h^{-1}$, hydrocarbons $C_{5+}$ were produced, the isoparaffins content was 26% in the synthetic oil and 39% by weight in the diesel fraction, the productivity for isoparaffins was 43 g/kgcat/h, the cloud point temperature of the synthetic oil was minus 69° C., and when the synthesis was carried out at the temperature of 246° C. and the syngas velocity of 5000 $h^{-1}$, the isoparaffins content was 29% by weight, the productivity for isoparaffins was 94 g/kgcat/h and the cloud point temperature was minus 74° C.

EXAMPLE 5

A catalyst comprising 3% of HMor (mordenite in H-form), 27% of Raney cobalt, 50% of Al and 20% of boehmite was prepared as follows.

Powders of HMor mordenite (0.3 g) and boehmite (2 g) was thoroughly mixed in a porcelain dish, the obtained mixture was peptized with a solution of 0.45 ml of $HNO_3$ (64%) in 7 ml of distilled water and mixed to form a homogeneous gel. Raney cobalt in the amount of 2.7 g, 5 g of PAP-2 aluminum powder, 1.5 g of triethylene glycol grade A and 3 g of ethyl alcohol were added into the prepared gel. The content of the dish was thoroughly mixed to form a homogeneous paste. The prepared paste was introduced into an extruder, the die diameter of which was 2.5 mm, and extruded. The obtained granules were held in air at the room temperature for 15 hours and calcined in a helium stream at the temperature increasing from 25 to 450° C. for 25 hours. The prepared granules were cooled to the room temperature and crushed to the particle size of 2.5×2.5 mm.

Thermal conductivity of the prepared catalyst was 4.22 W/m·K, the fraction of macropores in open porosity of the catalyst was 67.1%, and the fraction of mesopores of the size of 70-500 Å was 15.2%.

The catalyst was activated in a hydrogen stream (3000 $h^{-1}$) at the atmospheric pressure and temperature of 400° C. for 1 hour.

As a result of the synthesis from CO and $H_2$ at the temperature of 233° C. and the syngas velocity of 1000 $h^{-1}$, hydrocarbons $C_{5+}$ were produced, the isoparaffins content was 25% in the synthetic oil and 35% by weight in the diesel fraction, the productivity for isoparaffins was 35 $g/kg_{cat}$·h, the cloud point temperature of the synthetic oil was minus 67° C., and when the synthesis was carried out at the temperature of 248° C. and the syngas velocity of 5000 $h^{-1}$, the isoparaffins content was 29% by weight, the productivity for isoparaffins was 73 g/kgcat/h and the cloud point temperature was minus 71° C.

EXAMPLE 6

A catalyst comprising 40% of HZSM-5 (ZSM-5 in H-form), 20% of Raney cobalt, 40% of Al and 20% of boehmite was prepared as follows.

Powders of HZSM-5 zeolite (4 g) and boehmite (2 g) were thoroughly mixed in a porcelain dish, the obtained mixture was peptized with a solution of 0.45 ml of $HNO_3$ (64%) in 7 ml of distilled water and mixed to form a homogeneous gel. Raney cobalt in the amount of 2 g, 4 g of PAP-2 aluminum powder, 1.5 g of triethylene glycol grade A, and 3 g of ethyl alcohol were added to the prepared gel. The content of the dish was thoroughly mixed to form a homogeneous paste. The prepared paste was introduced into an extruder, the die diameter of which was 2.5 mm, and extruded. The obtained granules were held in air at the room temperature for 18 hours and calcined in an air stream at the temperature increasing from 25 to 450° C. for 25 hours. The prepared granules were cooled to the room temperature and crushed to the particle size of 2.5×2.5 mm.

Thermal conductivity of the prepared catalyst was 4.12 W/m·K, the fraction of macropores in open porosity of the catalyst was 68.3%, and the fraction of mesopores of the size of 70-500 Å was 14.8%.

The catalyst was activated in a hydrogen stream (3000 $h^{-1}$) at the atmospheric pressure and temperature of 400° C. for 1 hour.

As a result of the synthesis from CO and $H_2$ at the temperature of 225° C. and the syngas velocity of 1000 $h^{-1}$, hydrocarbons $C_{5+}$ were produced, the isoparaffins content was 19% in the synthetic oil and 39% by weight in the diesel fraction, the productivity for isoparaffins was 40 $g/kg_{cat} \cdot h$, the cloud point temperature of the synthetic oil was minus 70° C., and when the synthesis was carried out at the temperature of 237° C. and syngas velocity of 5000 $h^{-1}$, the isoparaffins content was 35% by weight, the productivity for isoparaffins was 110 $g/kg_{cat} \cdot h$ and the cloud point temperature was minus 77° C.

EXAMPLE 7 (for Comparison, Without Using Zeolite in H-form)

A catalyst comprising 25% of Raney Co, 50% of Al and 25% of boehmite was prepared as follows.

Boehmite in the amount of 2.5 g, 2.5 g of Raney cobalt, 5 g of PAP-2 aluminum powder, and 1.5 g of triethylene glycol grade A were mixed in a porcelain dish and peptized with a solution of 0.45 ml of $HNO_3$ (64%) in 10 ml of distilled water. The content of the dish was thoroughly mixed to form a homogeneous paste. The prepared paste was introduced into an extruder, the die diameter of which was 2.5 mm, and extruded. The obtained granules were held in air at the room temperature for 15 hours and calcined in an air stream at the temperature increasing from 25 to 450° C. for 27 hours. The prepared granules were cooled to the room temperature and crushed to the particle size of 2.5×2.5 mm.

Thermal conductivity of the prepared catalyst was 3.56 W/m·K, the fraction of macropores in open porosity of the catalyst was 80.1%, and the fraction of mesopores of the size of 70-500 Å was 24.1%.

The catalyst was activated in a hydrogen stream (3000 $h^{-1}$) at the atmospheric pressure and temperature of 400° C. for 1 hour.

As a result of the synthesis from CO and $H_2$ at the temperature of 233° C. and the syngas velocity of 2000 $h^{-1}$, hydrocarbons $C_{5+}$ were produced, the isoparaffins content was 13% in the synthetic oil and 8% by weight in the diesel fraction, the productivity for isoparaffins was 32 g/kgcat/h, the cloud point temperature of the synthetic oil was minus 15° C.

The invention claimed is:

1. A catalyst for producing isoparaffins-rich synthetic oil from CO and $H_2$, wherein said catalyst is a granulated porous composite material comprising:
    a three-dimensional heat-conducting structure of metal aluminum and Raney cobalt particles, and
    a binding component,
    wherein said binding component comprises H-form zeolite and wherein a fraction of macropores in an open porosity of the catalyst granules is 55-79% and a fraction of mesopores of the size of 70-500 Å in an open porosity of the catalyst granules is 7-20%, a fraction of micropores being the remainder.

2. The catalyst of claim 1, wherein the thermal conductivity of the catalyst granules is no less than 4 W/m·K.

3. The catalyst of claim 1, wherein said H-form zeolite comprises beta zeolite, mordenite, ZSM-5, or any combination thereof.

4. The catalyst of claim 1, wherein the content of said Raney cobalt is 10-50% of the catalyst weight.

5. The catalyst of claim 1, wherein the content of said metal aluminum is 10-50% of the catalyst weight.

6. The catalyst of claim 1, wherein the content of said binding component is 15-80% of the catalyst weight.

7. The catalyst of claim 1, wherein said binding component further comprises boehmite.

8. The catalyst of claim 7, wherein the content of said H-form zeolite is 20-70% of the weight of said binding component.

9. A method for preparing a catalyst of any of claims 2-8 for producing isoparaffins-rich synthetic oil from CO and $H_2$, the method comprising:
    mixing powders of a binding component,
    peptizing the obtained mixture with solution of nitric acid to obtain said binding component in the form of a homogeneous gel,
    mixing said homogeneous gel with a fine powder of Raney cobalt, a metal aluminum powder and a liquid phase to form a homogeneous paste,
    extruding the prepared paste to form granules and calcinating said granules,
    wherein said binding component powders comprise zeolite in H-form.

10. The method of claim 9, wherein said binding component powders further comprise boehmite.

11. The method of claim 9, wherein said liquid phase includes triethylene glycol and/or ethyl alcohol.

12. The method of claim 9, wherein said calcinating said granules is performed in air or inert atmosphere at the temperature increasing from 25° C. to 450° C. for 24-48 hours.

13. The method of claim 12, wherein said calcinating said granules is performed in air or inert atmosphere for 20-30 hours.

14. The method of claim 9, wherein the finished catalyst granules have thermal conductivity of no less than 4 W/m·K.

* * * * *